United States Patent
Xavier et al.

(10) Patent No.: US 10,507,458 B2
(45) Date of Patent: Dec. 17, 2019

(54) HYDROTREATING CATALYST AND PROCESS FOR PREPARING THE SAME

(71) Applicant: INDIAN OIL CORPORATION LIMITED, Mumbai, Maharashtra (IN)

(72) Inventors: Kochappilly Ouseph Xavier, Faridabad (IN); Alex Cheru Pulikottil, Faridabad (IN); Mohan Prabhu Kuvettu, Faridabad (IN); Brijesh Kumar, Faridabad (IN); Santanam Rajagopal, Faridabad (IN); Ravinder Kumar Malhotra, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 805 days.

(21) Appl. No.: 14/417,290

(22) PCT Filed: Aug. 29, 2013

(86) PCT No.: PCT/IB2013/058107
§ 371 (c)(1),
(2) Date: Jan. 26, 2015

(87) PCT Pub. No.: WO2014/033653
PCT Pub. Date: Mar. 6, 2014

(65) Prior Publication Data
US 2015/0209766 A1    Jul. 30, 2015

(30) Foreign Application Priority Data
Aug. 29, 2012 (IN) .......................... 2503/MUM/2012

(51) Int. Cl.
*B01J 37/00* (2006.01)
*B01J 27/19* (2006.01)
(Continued)

(52) U.S. Cl.
CPC ............. *B01J 27/19* (2013.01); *B01J 21/063* (2013.01); *B01J 21/12* (2013.01); *B01J 27/051* (2013.01);
(Continued)

(58) Field of Classification Search
CPC ...... B01J 27/0515; B01J 27/19; B01J 27/051; B01J 37/06; B01J 37/00; B01J 37/009;
(Continued)

(56) References Cited

U.S. PATENT DOCUMENTS 4,837,193 A    6/1989    Akizuki et al.
5,094,993 A    3/1992    Miura et al.
(Continued)

FOREIGN PATENT DOCUMENTS

AU        702448 B2       2/1999
WO    2010/121807 A1    10/2010

OTHER PUBLICATIONS

Saih et al., "Catalytic activity of CoMo catalysts supported on boron-modified alumina for the hydrodesulphurization of dibenzothiophene and 4,6-dimethyldibenzothiophene," Applied Catalysis A: General 353(2), pp. 258-265, Feb. 2009.*
(Continued)

*Primary Examiner* — Melvin C. Mayes
*Assistant Examiner* — Smita S Patel
(74) *Attorney, Agent, or Firm* — Maschoff Brennan (57) ABSTRACT

The current invention provides a hydrotreating catalyst comprising of metals of at least one each from Group VIB, preferably molybdenum and Group VIII, preferably nickel, of the periodic table supported on alumina modified with small amounts of modifying elements well dispersed on the surface so as to retain the physico-chemical characteristics of the support and result in high performance for hydrodesulphurization catalyst, and a commercially viable process
(Continued)

for producing such a catalyst. The present invention also discloses a commercially viable method for modifying alumina in the powder form without affecting the porous structure of the support obtained.

8 Claims, 2 Drawing Sheets (51) Int. Cl.
B01J 37/02 (2006.01)
B01J 21/06 (2006.01)
B01J 21/12 (2006.01)
B01J 27/051 (2006.01)
B01J 35/00 (2006.01)
B01J 37/04 (2006.01)
B01J 37/06 (2006.01)
B01J 37/08 (2006.01)

(52) U.S. Cl.
CPC ....... B01J 35/0013 (2013.01); B01J 37/0009 (2013.01); B01J 37/009 (2013.01); B01J 37/0207 (2013.01); B01J 37/04 (2013.01); B01J 37/06 (2013.01); B01J 37/08 (2013.01)

(58) Field of Classification Search
CPC .. B01J 37/00009; B01J 37/08; B01J 37/0207; B01J 37/0203; B01J 37/04; B01J 37/02; B01J 21/04; B01J 21/06; B01J 21/00; B01J 21/12; B01J 21/063
See application file for complete search history.

(56) References Cited

U.S. PATENT DOCUMENTS

| | | | |
|---|---|---|---|
| 5,484,756 A | 1/1996 | Isomae | |
| 5,507,940 A | 4/1996 | Ryan | |
| 6,306,289 B1 | 10/2001 | Hayashi et al. | |
| 7,968,069 B2 | 6/2011 | Rayo Mayoral et al. | |
| 2002/0082165 A1 | 6/2002 | Kasztelan et al. | |
| 2007/0123416 A1 | 5/2007 | Mayoral et al. | |
| 2009/0038993 A1* | 2/2009 | Gabrielov | B01J 23/85 208/243 |
| 2009/0139898 A1 | 6/2009 | Long et al. | |
| 2012/0205292 A1 | 8/2012 | Gabrielov et al. | |
| 2013/0153467 A1 | 6/2013 | Seki et al. | |

OTHER PUBLICATIONS

Weissman et al., "Performance, characterization, and surface acidity of zirconium modified hydroprocessing catalysts," Catalysis Letters 24(1), pp. 113-122, Mar. 1994.*
Iengo et al., "Preparation and properties of new acid catalysts obtained by grafting alkoxides and derivatives on the most common supports. Part II: Grafting zirconium and silicon alkoxides on γ-alumina," Applied Catalysis A: General 170(2), pp. 225-244, Jun. 1998.*
Zhao et al., "Aqueous Interfacial Chemistry in the Catalyst Preparation of NiMo/Al2O3 System by EDTA-Containing Impregnation," energy&fuels 20(5), pp. 1822-1827, Aug. 2006Escobar et al., "Effect of ethyleneglycol addition on the properties of P-doped NiMo/Al2O3 HDS catalysts: Part I. Materials preparation and characterization," Applied Catalysis.*
Escobar et al., "Effect of ethyleneglycol addition on the properties of P-doped NiMo/Al2O3 HDS catalysts: Part I. Materials preparation and characterization," Applied Catalysis B: Environmental 88(3-4), pp. 564-575, May 2009.*
Murali Dhar G. et al., "Mixed oxide supported hydrodesulfurization catalysts—a review", Catalysis Today, vol. 86, Issues 1-4, Nov. 1, 2003, pp. 45-60.

* cited by examiner

HYDROTREATING CATALYST AND PROCESS FOR PREPARING THE SAME

FIELD OF THE INVENTION

The present invention relates to a catalyst for use during oil refinery catalytic process, a hydrotreating catalyst with improved hydrodesulfurization activity for employing for the desulfurization of hydrocarbon streams. More particularly, the present invention relates to an improved hydrotreating catalyst composition and a process for preparing the same.

BACKGROUND OF THE INVENTION

Clean fuels research has become an important subject of environmental catalysis studies worldwide. The new government regulations in many countries all over the world including India demand the production and use of more environmentally friendly transportation fuels with lower contents of sulfur. In fact, control of noxious SOx and NOx gases from automobile engines and, for that purpose, near zero levels of S and N in transportation fuels are aimed for worldwide implementation in the coming years. Furthermore, in the meantime, the demand for transportation fuel has been increasing in most countries; especially the increase in demand for diesel fuel seems to be highly significant.

In the last decades, hydrotreating catalysts have been widely used for hydrotreating various hydrocarbon oils, more particularly for hydrodesulfurization, hydrodenitrogenation and hydrodearomatization of distillates, residual fractions from the crude oil distillation units, and hydrofining of lubricant oil fractions. Such hydrotreating catalyst should be highly active to desulfurize deeply even the weakly reactive refractory sulfur species. The chemistry of deep desulfurization of refractory sulfur compounds involves pre-hydrogenation followed by C—S bond cleavage as compared to the conventional direct desulfurization through hydrogenolysis reaction and therefore, the catalyst should be having superior design features that enable this reaction pathway for producing high quality diesel products.

These hydro treating catalysts comprise of a refractory inorganic oxide support such as alumina and metals of at least one each from Group VIB, preferably molybdenum and Group VIII, preferably cobalt or nickel of the periodic table supported on alumina. These catalysts have, on the alumina surface, layered clusters of molybdenum disulfide chemically modified with nickel or cobalt with coordinately unsaturated edge sites as active sites responsible for hydro desulfurization activity of the catalyst. Further, the basal plane of the molybdenum disulfide clusters has hydrogenation-active edge metallic sites which enable hydrogenation of refractory sulfur species and aromatics. The morphological features of the molybdenum disulfide layered metal sulfide clusters such as the degree of clustering and cluster length are the determining factors for catalytic activity needed for desulfurization performance.

However, there has been an increased demand for more active catalysts for effectively meeting the mandatory environmental restrictions enforced throughout the world to obtain better quality fuels with minimum level of pollutants like sulfur and nitrogen. In view of the depleting availability of lighter and sweeter crude oils worldwide, it is highly desirable for the catalyst to have high stability for enabling the processing of heavier and dirtier feedstocks containing significant amounts of sulfur, nitrogen and heavy metal contaminants like nickel and vanadium.

The composition and methodology of preparation of the catalyst carrier together with the design of catalyst active sites involving the control of physico-chemical characteristics, optimized interactions of active metals with the support surface and metal solution chemistry leads to enhanced activity and stability of the catalyst.

RELATED ART

U.S. Pat. No. 5,507,940 discloses a catalyst in which a liquid form of silicon compound is incorporated into an alumina supported Group VIB and Group VIII metal based catalyst and subsequently calcined at a temperature 300-600° C. in oxidizing atmosphere. The catalyst of U.S. Pat. No. 5,507,940 is loaded with 2-8% of $SiO_2$ as Si, and having surface area of about 120 $m^2/g$, pore volume between 0.2-0.6 ml/g, and also enhanced denitrification activity. However, this benefit was observed only when the silicon compound was incorporated after loading the metals in the alumina carrier, indicating that the referred patent does not disclose any methodology for the modification of the catalyst support.

U.S. Pat. Nos. 5,094,993 and 4,837,193 also disclose hydrotreating catalysts based on silica-alumina/silica-alumina containing catalyst carrier comprising 2 to 35% wt silica. According to the above US patents, the silica-alumina material was prepared by precipitation of a hydrogel from various starting materials of Si and Al and subsequently kneaded with crystalline alumina for preparing the silica-alumina containing catalyst carriers. The precipitation and kneading processes disclosed in these inventions have limitations to achieve the perfect micro-level dispersion and uniform distribution of the components of the carrier, which is highly necessary to form silicon-aluminium bonds uniformly distributed on alumina surface. As a result, appreciable improvement of activity is observed, only when the silica loading in the carrier is more than at least 2% wt.

Titania supported hydrogenation metals are known to have higher intrinsic activity than corresponding alumina based catalysts. However, the use of titania as a catalyst carrier for hydrotreating catalysts is limited due to its low pore volume and as a result only lower amounts of metal can be incorporated into the carrier by impregnating with the metal solution. For example in *Catalysis Today* 86 (2003) 5-6, M. Breysse et al reported a maximum Mo loading on a typical titania based carrier of the order of only about 6% wt due to the absence of necessary porous structure. However, in the case of mixed alumina-titania supported catalyst systems reported by G. M. Dhar et al. in *Catalysis Today* 86 (2003) 45-60, a maximum Mo content of 14% (as oxide) of total catalyst with increased metal dispersion could be impregnated.

It is also known in the prior art that these modifying materials have the potential for higher desulfurization performance than alumina support when used alone or in combination with alumina. The use of such materials alone as support is practically difficult due to their insufficient specific surface area to disperse the desired concentrations of active metals and also due to the high cost of the hydrodesulfurization catalyst derived from it. Accordingly, hydrodesulfurization catalysts have also been developed based on composite supports comprising of alumina and the modifying element as oxide to take the advantage of higher intrinsic activity of various modifying elements.

To overcome the difficulty of titania based systems for depositing sufficient amounts of metals due to the limitation of porous structure, U.S. Pat. Nos. 7,557,062 and 7,749,937 B2 disclosed a precipitated catalyst containing Group VIB and group VIII metals and a refractory oxide material which comprises 50% wt or more of titania, and having an improved hydrodenitrogenation and hydrodesulfurization activity. Although this titania containing catalyst is claimed to be better than its silica containing counterpart, the low surface area of titania containing precipitated catalysts is a matter of great concern, especially with regard to its stability to provide sustained performance for a longer duration.

A variety of preparation approaches have been employed for preparing the composite supports comprising of alumina and the modifying element as oxide.

U.S. Pat. No. 7,968,069 B2 also discloses a titania containing catalyst for hydrotreating, especially for hydrodesulfurization of residua and heavy crudes, wherein a titania-alumina carrier containing 3 to 6% wt of titania was prepared either by impregnating the extrudates of boehmite alumina with a titanium containing solution followed by drying and calcinations to obtain $TiO_2/Al_2O_3$ carrier or by impregnating on to boehmite alumina powder with a titanium containing solution followed by peptization, extrusion, drying and calcinations to obtain $TiO_2$—$Al_2O_3$ carrier. It is claimed in the invention that $TiO_2/Al_2O_3$ carrier has shown more stable performance than $TiO_2$—$Al_2O_3$ system as the pore size distribution has remained unaltered after the $TiO_2$ modification. However, impregnating the Ti containing solution by mixing with alumina powder has failed to perform as well due to unfavorable pore size distribution of the carrier obtained, indicating that the above invention is not suitable for alumina precursors in powder form.

U.S. Pat. No. 6,306,289 B1 discloses silica-alumina supported hydrotreating catalyst having both high desulfurization activity and denitrogenation activity with silica content in the range of 2 to 40% by weight, preferably in the range of 5 to 30% by weight based on the total weight of the carrier. According to the above disclosure, the silica-alumina material was prepared by precipitation of a hydrogel from various starting materials of Si and Al and subsequently kneaded with crystalline alumina for preparing the silica-alumina containing catalyst carriers. The precipitation and kneading processes disclosed in these inventions have limitations to achieve the perfect micro-level dispersion and uniform distribution of the components of the carrier, which is highly necessary for enhanced activity and stability of the catalyst.

US 2013/0153467 A1 discloses the use of silica-titania-alumina carrier comprising of 1-10% wt $SiO_2$ and 3-40% wt $TiO_2$ and 50% wt or more of $Al_2O_3$ prepared by precipitating the composite support from its precursor compounds by acid-base reaction. The catalyst prepared from this support is claimed to exhibit high desulfurization ability for hydrorefining of gas oil fractions.

U.S. Pat. No. 5,484,756 discloses the use of refractory alumina carrier containing a rare earth metal selected from a group consisting of dysprosium, erbium and holmium for the preparation of hydrodesulfurization catalyst. The catalyst prepared on this support is claimed to have higher desulfurization activities and longer life than the conventional catalysts. The rare earth element is incorporated either by kneading a rare earth metal solution with alumina along with active metals or a combined approach of kneading and impregnation so as to obtain rare earth content of 0.05 to 5% wt of the total weight of the supported catalyst. It is quite likely that, in the referred invention, perfect homogenization and uniform distribution of rare earth elements is hard to achieve by kneading process. Further, the effect of rare earth element in improving the support characteristics or the metal functions has not been clearly identified.

The inventions in the prior art related to the modification of alumina surface adopted methodologies like impregnation, mixing & precipitation for the addition of modifying element as oxide into the alumina. These techniques have the disadvantage of either reduced specific surface area of the resultant carrier to disperse enough active metals, reduced pore volume and unfavorable pore distribution due to blockage of alumina pores leading to poor catalytic performance, non-uniform distribution of the modifier on the alumina surface leading to deterioration of activity and stability of the catalyst or higher cost of the catalyst due to the requirement of large amount of modifier for appreciable activity improvement.

In light of the above discussion, there exists a need of better and improved catalysts for use in hydrotreatment processes. It is further desired that the catalyst effects desulfurization in presence of significant amounts of nitrogen species in the feed stock.

SUMMARY OF INVENTION

The present invention is established on the improved performance of the hydrotreating catalyst for the hydrodesulfurization of hydrocarbon oils is by modifying the alumina surface with modifying component comprising of one or more elements from a group comprising of boron, aluminium, silicon, titanium, cerium, and zirconium, as oxide and subsequently impregnating the support with a solution comprising of precursors of at least one metal of group VIB and precursors of at least one metal of group VIII of the periodic table. The support comprises of one or more elements from a group comprising of boron, aluminum silicon, titanium, cerium, and zirconium to an extent of 0.01 to 2% wt of the total weight of the carrier as oxide(s), more specifically 0.05 to 1.0% wt of the total weight of the carrier as oxide(s). The BET surface area, pore volume, pore diameter and pore size distribution of the modified gamma-alumina support is in same order as that of the unmodified gamma-alumina support, indicating that the porous structure of the alumina support is unaltered by the presence of the modifying elements. Thus, the present invention enables effective surface modification at very low levels of the modifying elements, with uniform distribution of the entire modifier chemically interacting with the alumina surface, avoiding the scope for the dumping of modifying elements in the porous structure of support systems, leading to retention of surface area, pore volume and pore size distribution, which is, unlike prior art inventions, highly advantageous for improving the catalytic activity.

The present invention also discloses a commercially viable method for modifying alumina in the powder form without affecting the porous structure of the support obtained.

The resultant support is impregnated with a solution comprising of precursors of at least one metal of group VIB and precursors of at least one metal of group VIII of the periodic table and then dried to obtain the hydrotreating catalyst of the current invention. More preferably, other additives such a phosphorous, chelating agents and stabilizing agents are also added in the impregnation solution to produce a hydrotreating catalyst of present invention, with improved activity for hydrodesulfurization of hydrocarbon oils.

Accordingly, the object of the present invention is to provide a hydrotreating catalyst comprising of metals of at least one each from Group VIB, preferably molybdenum and Group VIII, preferably nickel or cobalt of the periodic table supported on alumina modified with small amounts of modifying elements well dispersed on the surface so as to retain the physico-chemical characteristics of the support and result in high performance for hydrodesulfurization catalyst and a commercially viable process for producing such a catalyst.

DESCRIPTION OF THE INVENTION

The present invention provides a hydrotreatment catalyst with improved activity. The catalyst is used mainly for desulfurizing feedstocks to ultra-low sulfur levels at milder conditions. The feedstocks according to the invention comprise middle distillate feedstocks such as straight run gas oil (SRGO), light gas oil (LGO), heavy gas oil (HGO) or the mixtures of above streams to form a combined feed or the above combined feed containing 5-20% light cycle oil (LCO), and coker gas oil.

According to the invention, the catalyst has improved activity for desulfurizing feedstocks containing significant amounts of nitrogen species and aromatic rich cracked feed stocks.

More particularly, the present invention discloses a method for modifying alumina in the powder form without affecting the porous structure of the support obtained. Furthermore, the present invention also enables effective surface modification at very low levels of the modifying elements, with uniform distribution of the entire modifier chemically interacting with the alumina surface, avoiding the scope for the dumping of modifying elements in the porous structure of support systems, leading to lowering of surface area and pore volume.

According to the present invention, there is disclosed a process for production of a highly active and stable gas oil hydrotreatment catalyst, wherein the same comprises of a mixture as extrudate particles comprising molybdenum compounds, nickel compounds and inorganic oxide materials.

In the present invention, the inorganic oxide material comprises of alumina, which could be either gamma-alumina or eta-alumina or a mixture of gamma and eta forms of alumina, and a modifying element oxide additive.

In the present invention, the hydrotreatment catalyst is a hydrodesulfurization and hydrodenitrogenation catalyst.

According to the present invention, the process for production of the hydrotreatment catalyst comprises preparation of a support for the catalyst from alumina precursors, consisting of either pseudo-boehmite or bayerite or a mixture thereof, and a modifying component comprising one or more elements from a group comprising of boron, aluminium, silicon, titanium, cerium, and zirconium, and impregnating the support with a solution comprising of precursors of at least one metal of group VIB and precursors of at least one metal of group VIII of the periodic table.

According to an embodiment of the present invention, the process for synthesis of support comprises:
 a) slurring and stirring of pseudoboehmite alumina powder with a reactive solution of precursor of one or more modifying elements for a period of 1 to 12 hours, more specifically for 4 to 8 hours to obtain the grafted alumina with precursors of modifying elements bound to pseudoboehmite crystal structures.
 b) filtration of the grafted pseudoboehmite followed by uniformly wetting/washing the powder with demineralized water
 c) peptizing another portion of either a untreated pseudoboehmite or a grafted pseudoboehmite as per the above procedure by contacting with an inorganic acid to form a binder,
 d) admixing the binder with grafted pseudo-boehmite to obtain a homogeneous dough,
 e) extruding the homogeneous dough,
 f) ageing, drying and calcination to obtain the modified gamma-alumina support in which the modifying element is chemically bound to the surface of gamma-alumina.

The support comprises of one or more elements from a group comprising of boron, aluminium silicon, titanium, cerium, and zirconium to an extent of 0.01 to 2% wt of the total weight of the carrier as oxide(s), more specifically 0.05 to 1.0% wt of the total weight of the carrier as oxide(s). The BET surface area, pore diameter and pore size distribution of the modified gamma-alumina support is in the same range as that of the unmodified gamma-alumina support, indicating that the porous structure of the alumina support is unaltered by the grafting of the modifying elements.

According to the present invention, the catalyst comprises of at least one hydrogenation active metal from group VIB and at least one promoter element from group VIII incorporated into the porous matrix of the modified alumina. The catalyst has 1 to 5% by weight Group VIII metals, more specifically nickel and or cobalt as oxide and from 10 to 25% by weight Group VIB metal, more specifically, molybdenum as oxide.

The catalyst prepared according to the present invention was sulfided and scanned for the surface morphology by Transmission Electron Microscopy (TEM). TEM images show, as compared to the unmodified catalyst, layered $MoS_2$ phases with increased cluster height and lower cluster length. This results in the generation of more active reaction sites on the catalyst surface. The modifying elements, finely distributed on the alumina surface through grafting, are responsible to alter the surface characteristics of alumina and thereby enable the increased clustering of the $MoS_2$ layers and its dispersion.

The catalyst synthesized according to the process of the present invention using the modified support is having considerably improved efficiency for desulfurizing middle distillate feed stocks. In addition, the catalyst is resistant to the inhibition by nitrogen compounds leading to high activity even in the presence of high nitrogen content in the feedstocks. Further according to the invention, the catalyst synthesized according to the current invention is tolerant to a maximum nitrogen content of about 200-500 ppm in the feedstock and enables sustained desulfurization. The catalyst is also capable of improved desulfurization in the presence of cracked feed stocks like LCO and coker gasoil to the extent of 5-20%, which are rich in aromatics and olefinic components, as compared to a conventional catalyst system. Furthermore, the present invention enables the improvement of activity and stability to the extent at par to that of catalysts loaded with higher amounts of modifying elements as observed in the prior art.

The present invention discloses a composition for the hydrotreating catalyst for the hydrodesulfurization of the hydrocarbon oils, where the hydrotreating catalyst comprises of at least one metal of group VIB and at least one metal of group VIII of the periodic table supported on a support comprises of alumina modified with one or more elements from a group comprising of boron, aluminium, silicon, titanium, cerium, and zirconium, as oxide. The catalyst has 1 to 5% wt of Group VIII metals, more specifically 2 to 4% wt of nickel and or cobalt as oxide and from 10 to 25% wt of Group VIB metal, more specifically, from 14 to 23% wt of molybdenum as oxide supported on a support, wherein the said support comprises of alumina modified with one or more elements from a group comprising of boron, aluminium, silicon, titanium, cerium, and zirconium, as oxide, to an extent of 0.01 to 2% wt of the total weight of the carrier as oxide(s), more specifically 0.05 to 1.0% wt of the total weight of the carrier as oxide(s). More preferentially, other than Mo and Ni, phosphorous is also added in the impregnation solution to an extent of 2 to 10% wt, more specifically 4 to 8% wt as $P_2O_5$ of the total weight of the catalyst as oxide. The present invention also discloses a commercially viable process for the preparation of the modified support with superior catalytic properties so as to enable the hydro treating catalyst derived from such support exhibits improved hydrodesulfurization activity for the hydrodesulfurization of hydrocarbon oils.

The base material suitable for preparing the hydrotreating catalyst of the present invention should be having crystalline phases of pseudo-boehmite or boehmite with X-ray diffraction pattern wherein the area of the peaks corresponding to the crystalline phases should be more than 60% of the total area of the diffraction pattern, more specifically, the crystalline peak area should be more than 80% of the total area of the diffraction pattern. The preferred alumina material also should have a particle size distribution of more than 80% below 20 micron, more specifically more than 50% below 5 micron. In the typical examples provided, commercially available alumina comprises of 85% of crystalline phases of pseudo-boehmite and having aluminum content of 73% wt as oxide and sodium content as low as 0.002 wt % as oxide, is used. This alumina has particle size distribution of 60% below 5 micron, BET surface area of 220 $m^2/g$ and pore volume of 0.70 ml/g.

According to present invention the alumina powder is subjected surface modification using one or more modifying elements from a group comprising of boron, aluminium, silicon, titanium, cerium, and zirconium, as oxide. The organic precursors of the modifying elements are used as the source of the modifying elements. The organic precursors include alkyl oxides of Al, Ti and Zr like ethoxides, propoxides, butoxide and acetylacetonate, more specifically ethoxides and propoxides; silicon tetraacetate, silicon tetrachloride, tetraethyl ortho-silicate (TEOS), more specifically tetraethyl ortho-silicate for Si; boric acid, boron trichloride and boron trofluoride, more specifically, boron trichloride for boron and cerium acetylacetonate, cerium acetate and cerrous chloride, more specifically cerrous chloride for cerium. The modification of the alumina surface is achieved at low concentrations of the modifying elements by a solid-liquid reaction, wherein the said alumina is chemically reacted with a solution of the precursor of modifying elements in an inert solvent which has only little interaction with the alumina surface. The concentration of the precursor of the modifying element in the reaction media is adjusted so as to get a maximum of only 1% of the modifying element as oxide out of the total weight of the calcined support. When the content of the modifying element as oxide is more than 1%, agglomerization of the modifier is likely to occur in the pores of the alumina leading to reduction of pore volume of the desired mesopores and specific surface area of the modified support which is detrimentally affects the performance of the hydrotreating catalyst for hydrodesulfurization of hydrocarbon oils.

In such alumina that is used for the present invention, the surface aluminium atoms are linked together through oxygen atoms in the bulk and hydrogen atoms are cap the oxygen atoms for charge neutrality at the surface of the alumina, resulting in the formation of hydroxyl groups at the alumina surface. The precursor molecules of the modifying elements, due to its high affinity for reaction, readily reacts with surface hydroxyl groups and thus the precursor molecules are chemically grafted to the surface of alumina. The grafted precursor species is fully hydrolysed by contacting with water so as to form nano-scale distribution of moieties of the modifying elements on the surface. Finally on calcination, the surface moieties of the modifying elements are converted to their oxides finely supported on the alumina surface. Since the modified alumina has only low concentration of the modifying element and the modifying element grafted to surface hydroxyl groups, nano dispersion of the modifying elements is formed on the alumina surface For the hydrotreating catalyst of present invention, the metal components supported on the support are the combination of group VI B metal with a group VIII metal, e.g. molybdenum/cobalt, molybdenum/nickel, molybdenum/nickel and cobalt. The source of Ni can be nickel nitrate, nickel acetate, nickel sufate, nickel formate, nickel carbonate, nickel chloride, nickel hydroxide or their mixtures thereof. The source of Mo can be ammonium heptamolybdateor molybdenum oxide or their mixtures thereof. The phosphorous compound is preferably phosphoric acid, ammonium dihydrogenphosphate, trimetaphosphoric acid and pyrophosphoric acid, more preferably phosphoric acid. More preferably, the Mo salt is first treated with dilute hydrogen peroxide and to which then added phosphoric acid for better solubility of the Mo salts in the impregnation solution.

In addition to phosphorous species, the impregnation solution preferably contains chelating agents together with Mo salts. The chelating agent is added at a organic/Mo molar ratio of 0.05 to 0.4 more specifically 0.1 to 0.3. The preferred chelating agents are those molecules which contain one or more of amine groups. The chelating agents may be monoethanol amine, diethanol amine, diethyl amine, ethylenediaminetetraacetic acid (EDTA), diethylenetriaminepentaacetic acid (DTPA) and Nitrilotriacetic acid (NTA). In particular, monoethanol amine, diethanol amine and diethyl amine are preferred to be used as chelating agents.

It is particularly preferred according to present invention that the catalyst loaded with the active metals is further treated with stabilizing agents. The desired concentration of the stabilizing agent is 1 to 10% with respect to the total weight of the metal containing catalyst as oxide, more preferably 3 to 6% of stabilizing agent with respect to the total weight of the metal containing catalyst. The preferred stabilizing agents are diethylene glycol, triethylene glycol and polyethylene glycol and particularly diethylene glycol is preferred to be used.

The present invention discloses a commercially viable process for preparing the modified alumina support and a hydrotreating catalyst using the modified alumina support. According to the present invention, the process for synthesis of support comprises of the following steps: (a). The pseudo-boehmite alumina powder is slurried with a solution of precursor of one or more modifying elements in solvents like hexane, acetone, diethyl ether, iso-propanol and butanol, more preferably in iso-propanol and subsequently stirred for 2 to 12 hours, more specifically 4 to 8 hours in a stirred vessel to obtain modified alumina wherein the precursors of modifying elements are grafted to the pseudo-boehmite crystal structures. Alternatively, wet miller unit can also be used for enabling intimate contact of the modifying precursors with alumina surface; (b). The grafted pseudo-boehmite alumina is filtered out and subsequently the resultant solid is wetted and washed with demineralized water. The washing is to be continued till any of the loosely bound or unreacted species of the modifying elements are completely removed from the solid material. The filtration and washing can be carried out using either a filtration system under vacuum, filter press or centrifuge; (c) Another portion of a unmodified pseudo-boehmite is peptized by contacting with an inorganic acid by mix-mulling to form a binder. Preferably a dilute solution of the acid at a concentration of 0.5 to 10% wt of the total weight of the alumina solid as oxide, more preferably 1 to 5% wt, is used as the peptizing agent. The preferred inorganic acids may be nitric acid, hydrochloric acid, sulfuric acid and acetic acid, more preferably nitric acid and acetic acid; (d) The binder thus obtained from the previous step to an extent of 3 to 30% wt of the total alumina as oxide, more preferably 4 to 20% wt, is admixed with the modified pseudo-boehmite with the addition of additional water to obtain a homogeneous dough. Alternatively, the modified alumina can also be used for preparing the binder as the peptizability of the alumina is not altered by the addition of modifying elements; (e) The dough obtained containing the modified alumina is shaped into extrudates as cylinders or trilobes, granules or any other shapes and these shapes can be obtained by moulding process such as extrusion, granulation or any other appropriate process. The diameter of the extrudate is preferably in the range 0.5 to 3.0 mm, more preferably 1.0-1.5 mm; (f). The wet extrudates are aged at atmospheric conditions for a period of 6 to 24 hours, more specifically for 8 to 16 hours for the removal of moisture by slow evaporation. Further, the extrudate material may be dried at ambient to 150° C. for 8 to 24 hours and calcined at a temperature range of about 250 to 800° C. for 1 to 8 hours, more preferably in the range 250° C. to 600° C. for 2 to 6 hours. The calcined alumina support thus obtained has the modifying element chemically bound to the surface of gamma-alumina, as oxide.

The present invention also discloses a preparation process for impregnating the modified alumina support with a solution comprising of precursors of at least one metal of group VIB and precursors of at least one metal of group VIII of the periodic table. In particular, the present invention also gives a process for incorporating other additives such a phosphorous, chelating agents and stabilizing agents in the impregnation solution to produce a hydrotreating catalyst with improved activity for hydrodesulfurization of hydrocarbon oils.

The Mo salt(s) is first dissolved in dilute hydrogen peroxide and subsequently treated with the chelating agent. This solution is then acidified with required amount of phosphoric acid. In this solution Ni salt(s) are dissolved to obtain the metal solution to be used for impregnation of the alumina support. The process for loading the metals is an incipient impregnation process in which a solution volume just sufficient to fill the pore (wet impregnation) of support is used. The volume of the solution for impregnation would have the desired amount of metal loading in the final catalyst. The catalyst obtained after impregnating the metal solution is dried at a temperature of 80-150° C., more preferably at 100-120° C. for 4 to 24 hours, more preferably 6-16 hours. The resulting metal loaded catalyst is further impregnated with a dilute solution of stabilizing agent and then dried as above. Drying of the catalyst at temperatures above 150° C. is not desired as it causes the decomposition of either the chelating agent or stabilizing agent or both.

The alumina support and hydrotreating catalyst produced as mentioned above is characterized for the determination of the surface area, volume of the pores and pore size distribution by low temperature nitrogen adsorption method. The surface area of the modified alumina support, according to present invention, preferably in the range of 150 to 280 $m^2/g$, more preferably in the range of 180 to 250 $m^2/g$. Preferably the pore volume may be 0.4 to 0.9 ml/g, more preferably 0.6 to 0.9 ml/g. Further the support is preferred to have at least 50% pores in the pore diameter range 60-120 Å, more preferably at least 60% pores in the pore diameter range 60-120 Å. According to present invention, the surface area, pore volume and pore size distribution of the parent alumina is retained on surface modification of the alumina as per the preparation process of the invention. The hydrotreating catalyst derived from the modified support preferably have a surface area of 100 to 150 $m^2/g$ more preferably 100 to 120 $m^2/g$ and pore volume preferably in the range 0.2 to 0.5 ml/g and more preferably 0.3 to 0.4 ml/g.

The hydrodesulfurization catalyst thus obtained is pre-sulfided to form a hydrodesulfurization catalyst comprising of layered clusters of the molybdenum disulfide. The pre-sulfidation is carried out by treating the catalyst with a hydrocarbon oil already mixed with a sulfiding agent at a temperature of 200 to 400° C. and a hydrogen pressure of 10 to 60 bar, more preferably at 300 to 350° C. and a hydrogen pressure of 20-40 bar, so as to convert the chelated molybdenum species to layered clusters of $MoS_2$. The sulfiding agents may be hydrogen sulfide or dimethyl disulfide to be mixed with the hydrocarbon oil, more particularly dimethyl disulfide is preferred to be used.

The hydrotreating catalyst resultant of current invention, on sulfidation, forms layered clusters of molybdenum disulfide on the alumina surface with coordinatively unsaturated edge sites. As observed from Transmission Electron Microscopy (TEM) images of the hydrotreating catalyst resultant of current invention, the molybdenum sulfide layers are formed on support alumina either as single or double stacks to an extent of 80% or more out of the total number of $MoS_2$ clusters (generally >100) visualized in the images. The hydrotreating catalyst resultant of current invention has 50% of $MoS_2$ cluster lengthin the range of 1-3 nm, and more than 90% of the clusters are below 5 nm indicating a good dispersion of the active sites of the catalyst. The improved performance of the hydrotreating catalyst of the current invention for hydrodesulfurization of hydrocarbon oils is attributed to better dispersion of the active metals. Further, the modification of alumina surface with the modifying elements enables the reduction of metal support interactions which also leads to higher reactivity of the $MoS_2$ clusters and thus improved activity of the catalyst for hydrodesulphurization.

Figure 1:
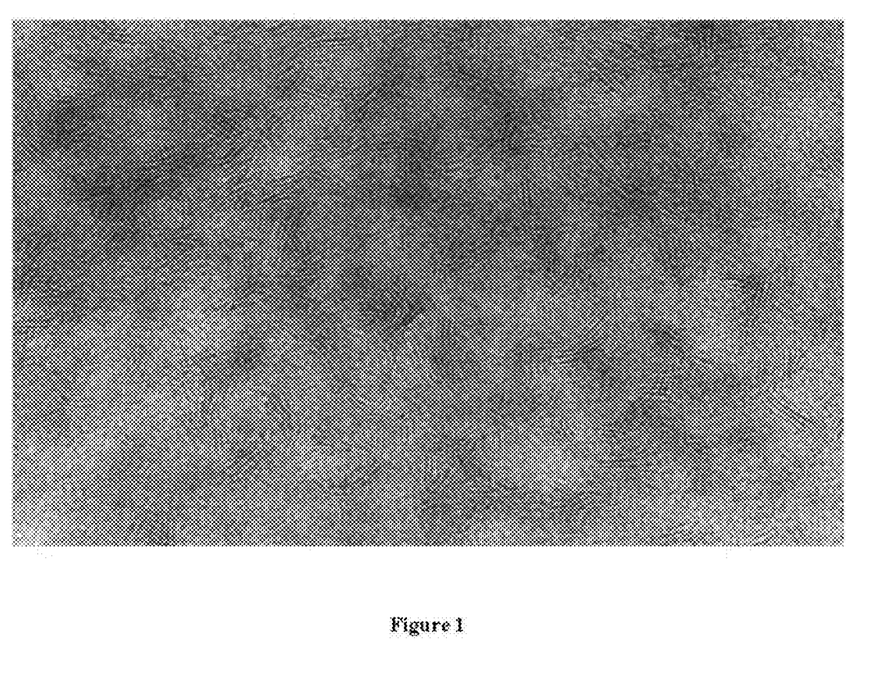
FIG. 1: TEM image of hydrotreating catalyst of present invention, catalyst A—NiMo system prepared using alumina support modified with $TiO_2$.

The hydrodesulfurization catalyst thus obtained with metal sulfides is visualized by TEM. The lattice resolved TEM micrograph of the MoS$_2$ clusters with layered structures is shown in FIG. 1 and the morphological characteristics of the catalyst are provided in Table 3. The TEM study of the MoS$_2$ clusters having layered structures is based on more than 100 micrographs which are carefully investigated to ascertain the reliability of the inferences drawn on the morphological characteristics of MoS$_2$ clusters. According to the present invention, more than 50% of molybdenum disulfide layers have single or double layers, more specifically more than 80% of the clusters have single or double layers out of the total number of clusters observed resulting in enhanced catalytic performance. The MoS$_2$ cluster length of below 3 nm at least for 30% of the total number of the clusters, more specifically at least 50% and at least 80% of clusters, more specifically 90% clusters having cluster length below 5 nm is achieved.

The existence of nano sized MoS$_2$ crystallites finely dispersed on the catalyst surface, which can provide large number of edge NiMoS sites, accounts for the high hydrodesulfurization activity of the catalyst prepared according to the present invention. According to present invention, the MoS$_2$ clusters that exist as single or double layers in large number are of high reactivity due to the avoidance of strong chemical interaction between the alumina surface and MoS$_2$ by the uniformly grafted modifying elements on the surface of alumina. The existence of majority of MoS$_2$ as single or double layer is also advantageous for making available large number of hydrogenation active edge metallic sites on the basal plane of the MoS$_2$ clusters in addition to the cluster edge sites that can activate the hydrodesulfurization reaction by C—S bond cleavage.

The invented catalyst is an excellent catalyst for hydrodesulfurisation of gas oil containing total sulfur in the range 8000 ppm to 15000 ppm and more preferably 8000 to 12000 ppm including refractory sulfur. In particular, the hydrotreating catalyst of present invention is capable for the hydrodesulfurization of gas oils containing 5-30% of LCO feed stock, more specifically 5-20% of LCO feed stock from FCC unit which is generally having high aromatic content. The hydrogenation function of the hydrotreating catalyst of the present invention enables saturation of aromatic compounds, leading to improvement of cetane index.

The hydrotreating catalyst produced according to the present invention was used for the desulfurization of gas oil feeds after it is presulfided prior to its use. This presulfidation may be performed in-situ, that is, inside a reactor. The catalyst, in the presence of hydrogen containing gas, is brought into contact with gas oil doped with sulfur compounds e.g. DMDS about 100 to 400 Nm$^3$/m$^3$ under conditions including a temperature of about 120 to 350° C., a pressure (total pressure) of about 10 to 50 bar and a liquid hourly space velocity of about 1 to 4 h$^{-1}$. After this sulfiding treatment, the operation is continued with the actual diesel feed stock under operation conditions suitable for the desulfurisation of the feed stock. The preferred reactor for performing hydrodesulfurisation is a fixed bed tubular reactor.

Figure 2:
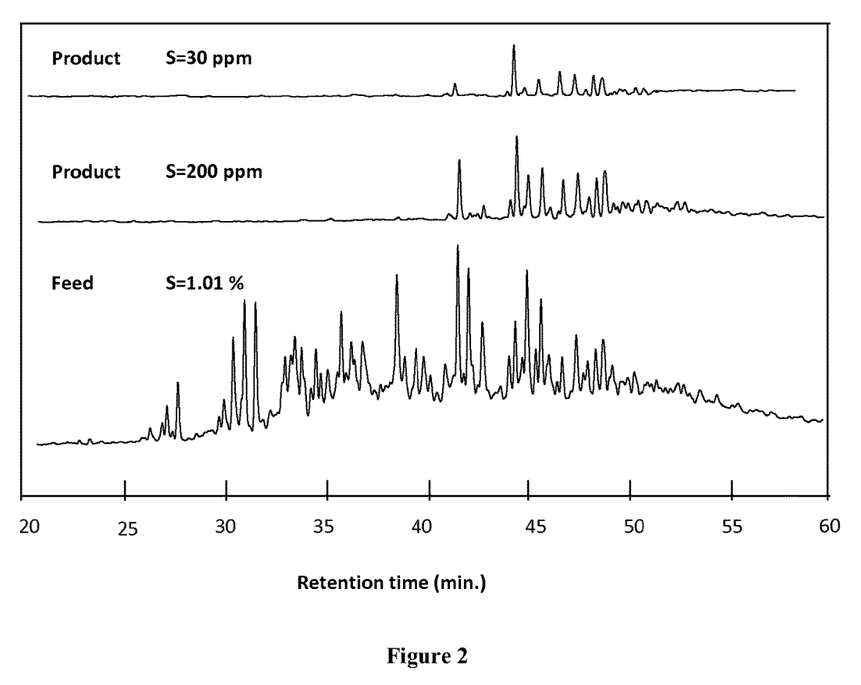
FIG. 2: GC-SCD patterns of the hydrocarbon products at different sulfur levels for hydrotreating catalyst of present invention, catalyst A—NiMo system prepared using alumina support modified with $TiO_2$.

The catalyst of the present invention is effective in the removal of refractory sulfur compounds compared to the conventionally prepared catalyst. This illustrated with the GC-SCD (GC with Sulfur chemiluminescence detector) analysis of the products in FIG. 2. The activity of the catalyst for hydrodesulfurizing the refractory sulfur species indicate increased hydrogenation function of the catalyst together with hydrodesulfurization function as the hydrogenation of the refractory sulfur species is prerequisite for the hydrodesulfurization of such molecules to take place. The improved performance of the catalyst may be attributable to the surface modification of alumina by grafting according to present invention which in turn induce the formation of nano-scale dispersion of MoS$_2$ clusters, mostly in single or double layers and thereby providing suitable hydrogenation-active and hydrodesulfurization-active sites in large number for the hydrogenation and subsequent hydrodesulfurization of the majority of the refractory sulfur compounds.

The following non-limiting examples illustrate in details about the invention. However, they are not intended to be limiting the scope of present invention in any way.

Example 1

Preparation of Hydrodesulfurization Catalyst A
1. Preparation of Alumina Support Modified with TiO$_2$:

Pseudo-boehmite alumina powder was dried at 120° C. for 24 hours and then cooled. The LOI (Loss of Ignition) of the powder was determined by Thermogravimetry at 500° C. and found to be around 27%. The resultant dried powder (343 g, 72.9% Al2O3) was slurried with a solution of titanium isopropoxide (9.18 g, 97%) dissolved in 500 ml of isopropanol and stirred at atmospheric temperature for a period of 6 hours. The alumina material was filtered out under vacuum. The solid material thus obtained was wetted with 50 ml of demineralized water and then washed with excess of water (1.0-1.5 L). The resultant solid material was then dried at 120° C. for 24 hours to obtain the grafted alumina. Another portion of pseudo-boehmite alumina powder (17 g, 72.9% Al$_2$O$_3$) was peptized by contacting and mixing with dilute nitric acid (approximately 22.5 ml, 1.1 w/v %) solution. The nitric acid solution was added slowly over a period of 15 minutes and the wet material was further mixed and mulled for 30 minutes. The resultant binder alumina was then admixed with the grafted alumina powder to obtain a homogeneous dough. This dough was then extruded to 1.2 mm diatrilobeextrudates using a Collins Extruder. The wet extrudates were aged for 12 hours, then dried at 120° C. for 12 hours and then calcined at 500° C. for 3 hour to obtain the alumina support A.

The catalyst support thus obtained was analyzed for TiO$_2$ content, pore volume, average pore diameter and pore size distribution and the results are given in Table 1.

TABLE 1

Physico-chemical characteristics of the catalyst supports of present invention

| | | Support A | Support B | Support C |
|---|---|---|---|---|
| Composition | | Al$_2$O$_3$ + TiO$_2$ | Al$_2$O$_3$ + SiO$_2$ | Al$_2$O$_3$ + TiO$_2$ + SiO$_2$ |
| Silica | % wt | 0.00 | 0.82 | 0.44 |
| Titania | % wt | 0.75 | 0.00 | 0.38 |
| Surface area | m$^2$/g | 192 | 192 | 192 |
| Pore volume | ml/g | 0.67 | 0.67 | 0.67 |
| Ave. pore diameter | Å | 91 | 91 | 91 |
| Pore size distribution | % | | | |
| >120 Å | | 29 | 30 | 29 |
| 60-120 Å | | 66 | 65 | 65 |
| <60 Å | | 5 | 5 | 6 |

Preparation of Hydrodesulfurization Catalyst

The catalyst formulation was prepared with metal contents of 3.5% wt Ni as NiO, 16.6% wt Mo as MoO$_3$ and 6.5% wt P as P$_2$O$_5$, each based on weight of the oxide form of catalyst, on the above alumina support modified with TiO$_2$.

The pore volume impregnation technique was used in which the volume of metal salt solution was adjusted so as to just sufficient to fill the pores of the alumina carrier. The solution of Mo and Ni compounds was prepared as follows for impregnating 73.4 g of the support as oxide.

Ammonium heptamolybdate (15.74 g, 99%) was mixed with 20 mL of DM water and stirred for 10 minutes. To this solution was slowly added 5 ml of 30% $H_2O_2$. The solution was stirred and warmed to dissolve the solid completely. To this solution was added molybdenum trioxide (3.82 g, 99.5%) and stirred. To this solution was added diethyl amine (2.59 g, 99%) slowly under stirring. The solution was warmed to dissolve the solid completely. The resulting Mo solution was then reacted with phosphoric acid (10.21 g of 88%). Nickel nitrate hexahydrate (8.34 g, 98%) and nickel carbonate (2.59 g, 42.5% Ni) were then added. The solution was heated to approximately 60° C. and stirred for complete dissolution of the solid compounds and then cooled.

The solution was diluted and impregnated on alumina support modified with $TiO_2$ with thorough shaking After the solution was added completely, the wet extrudates were kept in a closed vessel under shaking for ensuring uniform penetration of the solution. This material was then dried at 120° C. for 8 hours to obtain the supported catalysts. This catalyst was further impregnated by incipient wetness method with an aqueous solution of diethylene glycol (5.10 g, 98%) and then again dried at 120° C. for 8 hours to obtain Catalyst A.

Example 2

Preparation of Hydrodesulfurization Catalyst B
Preparation of Alumina Support Modified with $SiO_2$ and Hydrodesulfurization Catalyst B The alumina support modified with $SiO_2$ was prepared in the same manner as in example 1, except that solution of tetraethyl orthosilicate (TEOS) (8.84 g, 98%) dissolved in 500 ml of iso-propanol was used for grafting the alumina surface with Si species in place of the Ti precursor solution, to obtain support B.

The catalyst support thus obtained was analyzed $SiO_2$ content, pore volume, average pore diameter and pore size distribution and the results are given in Table 1.

The catalyst formulation was prepared as described in example 1 with metal contents of 3.5% wt Ni as NiO, 16.5% wt Mo as $MoO_3$ and 6.5% wt P as $P_2O_5$, each based on weight of the oxide form of catalyst, on the above alumina support modified with $SiO_2$, to obtain Catalyst B.

Example 3

Preparation of Hydrodesulfurization Catalyst C
Preparation of Alumina Support Modified with $TiO_2$ and $SiO_2$ and Hydrodesulfurization Catalyst C.

The alumina support modified with $SiO_2$ was prepared in the same manner as in example 1, except that a mixed solution of titanium isopropoxide (4.59 g, 97%) and tetraethyl orthosilicate (TEOS) (4.42 g, 98%) dissolved in 500 ml of iso-propanol was used for grafting the alumina surface with both the Si and Ti species, to obtain support C.

The catalyst support thus obtained was analyzed $SiO_2$ and $TiO_2$ content, pore volume, average pore diameter and pore size distribution and the results are given in Table 1.

The catalyst formulation was prepared as described in example 1 with metal contents of 3.5% wt Ni as NiO, 16.5% wt Mo as $MoO_3$ and 6.5% wt P as $P_2O_5$, each based on weight of the oxide form of catalyst, on the above alumina support modified with $TiO_2$ and $SiO_2$, to obtain catalyst C.

Comparative Example 1

The catalyst support was prepared in the same manner as in example 1, except that pseudo-boehmite alumina powder without any modification was mixed with the dilute nitric acid solution used for the peptization of alumina powder prior to the extrusion step. The extrudates of the alumina support obtained were modified by incipient wetness pore volume impregnation with a solution of titanium isopropoxide (27.54 g, 97%) dissolved in required amount of isopropanol and then dried at 120° C. for 12 hours and then calcined at 500° C. for 3 hour to obtain support R1.

The catalyst was prepared on above support with metal loading of 3.5% w Ni as NiO, 16.5% w Mo as $MoO_3$, and 6.5% wt P as $P_2O_5$, each based on weight of the oxide form of catalyst, on the above support, by the pore volume impregnation of the support with a metal solution prepared in the same manner as in example 1 to obtain comparative catalyst R1.

Comparative Example 2

The catalyst support was prepared in the same manner as in example 1, except that pseudo-boehmite alumina powder without any modification was mixed with the dilute nitric acid solution used for the peptization of alumina powder prior to the extrusion step. The extrudates of the alumina support obtained were modified by incipient wetness pore volume impregnation with a solution of sodium silicate (28.3 g, 26.5% $SiO_2$) dissolved in required amount of water and then dried at 120° C. for 12 hours and calcined at 500° C. for 3 hour to obtain support R2.

The catalyst was prepared on above support with metal loading of 3.5% w Ni as NiO, 16.5% w Mo as $MoO_3$, and 6.5% wt P as $P_2O_5$, each based on weight of the oxide form of catalyst, on the above support, by the pore volume impregnation of the support with a metal solution prepared in the same manner as in example 1 to obtain comparative catalyst R2.

Comparative Example 3

The catalyst support was prepared in the same manner as in example 1, except that pseudo-boehmite alumina powder without any modification was mixed with the dilute nitric acid solution used for the peptization of alumina powder prior to the extrusion step. The extrudates of the alumina support obtained were modified by incipient wetness pore volume impregnation sequentially, first with a solution of titanium isopropoxide (13.77 g, 97%) in isopropanol and then with a solution of sodium silicate (14.2 g, 26.5% $SiO_2$), with drying at 120° C. for 12 hours and calcined at 500° C. for 3 hour, after each impregnation, to obtain support R3.

The catalyst was prepared on above support with metal loading of 3.5% w Ni as NiO, 16.5% w Mo as $MoO_3$, and 6.5% wt P as $P_2O_5$, each based on weight of the oxide form of catalyst, on the above support, by the pore volume impregnation of the support with a metal solution prepared in the same manner as in example 1 to obtain comparative catalyst R3.

Comparative Example 4

The catalyst support was prepared in the same manner as in example 1, except that pseudo-boehmite alumina powder without any modification was mixed with the dilute nitric acid solution used for the peptization of the alumina powder prior to the extrusion step. The extrudates of the alumina support obtained was dried at 120° C. for 12 hours and calcined at 500° C. for 3 hour to obtain support R4.

The catalyst was prepared on above support with metal loading of 3.5% w Ni as NiO, 16.5% w Mo as $MoO_3$, and 6.5% wt P as $P_2O_5$, each based on weight of the oxide form of catalyst, on the above support, by the pore volume impregnation of the support with a metal solution prepared in the same manner as in example 1 to obtain comparative catalyst R4.

Comparative Example 5

The catalyst support was prepared in the same manner as in example 1, except that pseudo-boehmite alumina powder without any modification was mixed with the dilute nitric acid solution used for the peptization of the alumina powder prior to the extrusion step. The extrudates of the alumina support obtained was dried at 120° C. for 12 hours and calcined at 500° C. for 3 hour.

The catalyst was prepared on above support with metal loading of 3.5% w Ni as NiO, 16.5% w Mo as $MoO_3$, and 6.5% wt P as $P_2O_5$, each based on weight of the oxide form of catalyst, on the above support, by the pore volume impregnation of the support with a metal solution prepared in the same manner as in example 1, except that no chelating agent such as diethyl amine was added in the Mo solution, to obtain comparative catalyst R5.

Comparative Example 6

The catalyst support was prepared in the same manner as in example 1, except that pseudo-boehmite alumina powder without any modification was mixed with the dilute nitric acid solution used for the peptization of the alumina powder prior to the extrusion step. The extrudates of the alumina support obtained was dried at 120° C. for 12 hours and calcined at 500° C. for 3 hour.

The catalyst was prepared on above support with metal loading of 3.5% w Ni as NiO, 16.5% w Mo as $MoO_3$, and 6.5% wt P as $P_2O_5$, each based on weight of the oxide form of catalyst, on the above support, by the pore volume impregnation of the support with a metal solution prepared in the same manner as in example 1, except that no stabilizing agent such as diethylene glycol was incorporated in the catalyst, to obtain comparative catalyst R6.

TABLE 3

Morphological characteristics of catalysts of the invention

|  |  | Catalyst A | Comparative Catalyst R1 |
|---|---|---|---|
| $MoS_2$ cluster height distribution | % |  |  |
| 1-2 layers |  | 82 | 47 |
| 2-4 layers |  | 18 | 35 |
| >4 layers |  | 0 | 18 |
| $MoS_2$ cluster length distribution | % |  |  |
| 1-3 nm |  | 55 | 26 |
| 3-5 nm |  | 36 | 44 |
| >5 nm |  | 9 | 30 |

Example 7

Activity Evaluation of the Catalysts

The catalytic activity was evaluated using a high pressure, isothermal, fixed bed micro reactor (Xytel, India) operating in a down flow mode. 5 cc of the catalyst is packed after dilution with inactive carborundum particles in order to minimize channeling and to maintain a plug flow. Prior to the reaction the catalyst was sulfided with a straight run gas oil feed doped with 5% Dimethyl disulfide (DMDS). After the completion of the sulfidation, the feed, gas oil blended with 10% LCO, was charged in to the reactor at the operating conditions. Sample collection was done after achieving a steady state. The hydrodesulfurization activity testing was performed under the conditions shown in Table 4. The feed and product samples were analyzed the total S content based on oxidative pyro-fluorescence using an ANTEK 7000 Total Sulfur analyzer. The relative activity of the catalyst samples are represented in terms of the temperature required for each catalyst for achieving hydrodesulfurization to the same level of around 50 ppmw. The results of the performance evaluation are given in Table 5. The characteristics of the gas oil feed and a typical product are given in Table 6.

TABLE 2

Physico-chemical characteristics of the catalyst supports of comparative catalysts

|  |  | Support R1 | Support R2 | Support R3 | Support R4 |
|---|---|---|---|---|---|
| Composition |  | $Al_2O_3$ + $TiO_2$ | $Al_2O_3$ + $SiO_2$ | $Al_2O_3$ + $TiO_2$ + $SiO_2$ | $Al_2O_3$ |
| Silica | % wt | 0.00 | 3.0 | 1.5 | 0.00 |
| Titania | % wt | 3.0 | 0.00 | 1.5 | 0.00 |
| Surface area | $m^2/g$ | 170 | 182 | 175 | 193 |
| Pore volume | ml/g | 0.47 | 0.53 | 0.51 | 0.67 |
| Ave. pore diameter | Å | 54 | 66 | 59 | 92 |
| Pore size distribution | % |  |  |  |  |
| >120 Å |  | 23 | 25 | 20 | 30 |
| 60-120 Å |  | 44 | 40 | 42 | 66 |
| <60 Å |  | 33 | 35 | 38 | 4 |

TABLE 4

Catalyst testing conditions

| Parameters | Conditions | |
|---|---|---|
| | Pre-sulfidation | Reaction |
| $H_2$ pressure (Bar) | 30 | 60 |
| $H_2$/Oil ratio (Nm$^3$/m$^3$) | 100 | 375 |
| LHSV (h$^{-1}$) | 1.75 | 1.5 |
| Temperature (° C.) | 330 | 330-370 |

TABLE 5

Physico-chemical characteristics of the catalysts of the invention

| | Catalyst A | Catalyst B | Catalyst C | Com. Catalyst R1 | Com. Catalyst R2 | Com. Catalyst R3 | Com. Catalyst R4 | Com. Catalyst R5 | Com. Catalyst R6 |
|---|---|---|---|---|---|---|---|---|---|
| $MoO_3$ (wt %) | 16.5 | 16.5 | 16.5 | 16.5 | 16.5 | 16.5 | 16.5 | 16.5 | 16.5 |
| NiO (wt %) | 3.5 | 3.5 | 3.5 | 3.5 | 3.5 | 3.5 | 3.5 | 3.5 | 3.5 |
| $P_2O_5$ (wt %) | 6.5 | 6.5 | 6.5 | 6.5 | 6.5 | 6.5 | 6.5 | 6.5 | 6.5 |
| Surface area (m$^2$/g) | 112 | 115 | 114 | 97 | 98 | 97 | 112 | 111 | 112 |
| Pore volume (ml/g) | 0.35 | 0.36 | 0.36 | 0.31 | 0.31 | 0.30 | 0.37 | 0.37 | 0.37 |
| Chelating agent | Ethanol amine | Ethanol amine | Ethanol amine | Ethanol amine | Ethanol amine | Ethanol amine | Ethanol amine | Nil | Ethanol amine |
| Stabilizing agent | Diethylene glycol | Diethylene glycol | Diethylene glycol | Diethylene glycol | Diethylene glycol | Diethylene glycol | Diethylene glycol | Diethylene glycol | Nil |
| HDS reaction temperature (° C.) | 338 | 340 | 339 | 343 | 345 | 344 | 348 | 354 | 351 |
| S content of product oil, ppmw | 48 | 51 | 50 | 49 | 50 | 47 | 52 | 53 | 48 |
| N content of product oil, ppmw | 6 | 4 | 7 | 12 | 15 | 14 | 21 | 26 | 23 |

TABLE 6

Characteristics of the Hydrocarbon oil feedstock & product

| Sample | Unit | Gas oil feed with 10% LCO | Product oil for catalyst A |
|---|---|---|---|
| Sulfur content | ppmw | 10100 | 48 |
| Nitrogen content | ppmw | 168 | 6 |
| Density at 15° C. | g/ml | 0.8650 | 0.8465 |
| Distillation | Vol. % Vs ° C. | | |
| IBP | | 123 | 119 |
| 10 | | 245 | 232 |
| 30 | | 285 | 275 |
| 50 | | 320 | 307 |
| 70 | | 333 | 326 |
| 90 | | 358 | 353 |
| FBP | | 373 | 368 |
| Total aromatic content | % | 33.5 | 31.0 |
| Mono-aromatics | % | 18.0 | 27.0 |
| Di-aromatics | % | 13.0 | 4.0 |
| Poly-aromatics (Di-aromatics+) | % | 2.5 | 0.0 |
| Cetane Index | | 50 | 56 |

What claimed is:

1. A process for preparing a hydro treatment catalyst comprising an inorganic oxide material based carrier, a group VI B metal and a group VIII metal adsorbed to the carrier, wherein the inorganic oxide material based carrier comprises alumina matrix and a modifying element grafted to the alumina matrix, and the modifying element being present in an amount in the range of 0.01 to 2% of a total weight of the inorganic oxide material based carrier, said process comprising the steps of:

a. preparing a solution comprising a modifying element additive;

b. adding alumina powder to the aforesaid solution to obtain alumina matrix comprising modifying element grafted to surface of alumina;

c. filtering the alumina matrix and washing the same to remove non-grafted modifying element additive;

d. mixing the alumina matrix with a binder to obtain a homogenous dough;

e. extruding the dough to form a solid material;

f. drying, ageing and calcining the solid material to obtain the inorganic oxide material based carrier comprising alumina matrix and the modifying element grafted to the alumina matrix; and g. impregnating a solution of group VI B metal and a group VIII metal to the inorganic oxide material based carrier to obtain the hydro treatment catalyst;

wherein the group VI B metal is an oxide of molybdenum and the group VIII metal is an oxide of nickel or cobalt or mixture thereof;

wherein the modifying element is selected from a group consisting of boron, aluminium, silicon, titanium, cerium and mixtures thereof; and wherein said impregnating solution is reacted with 0.01-1 moles of a suitable amine compound per mole of Mo selected from the group of compounds consisting of monoethanol amine, diethanol amine and diethyl amine.

2. The process as claimed in claim 1, wherein the modifying element additive is an organic compound having an organic moiety and the modifying element, the organic moiety having affinity to hydroxyl groups.

3. The process as claimed in claim 1, wherein the modifying element being present in an amount in the range of 0.05 to 1% the percentage being on the basis of a total weight of the inorganic oxide material based carrier.

4. The process as claimed in claim 1, wherein the group VIII metal is present in an amount in the range of 1 to 5%.

5. The process as claimed in claim 1, wherein the group VI B metal is present in an amount in the range of 10 to 25%.

6. The method of claim 1, wherein the hydro treatment catalyst obtained is incorporated with additional organic additive from the group of compounds consisting of diethylene glycol, triethylene glycol, polyethylene glycol as stabilizer to an impregnating solution of group VI B metal and a group VIII metal on the modified support.

7. The method of claim 1, wherein the hydro treatment catalyst further comprising formation of nano-scale dispersion of MoS2 clusters having cluster length of less than 5 nm.

8. The method of claim 1, wherein the hydro treatment catalyst obtained exhibits hydrodesulfurization activity suitable for desulfurization of gas oil feeds with more than 1.0% wt S to ultra-low sulfur levels (<50 ppmw).

* * * * *